United States Patent
Gupta et al.

(10) Patent No.: US 11,431,174 B2
(45) Date of Patent: Aug. 30, 2022

(54) POWER CONTROL FOR HYBRID POWER PLANT

(71) Applicant: VESTAS WIND SYSTEMS A/S, Aarhus N (DK)

(72) Inventors: Manoj Gupta, Singapore (SG); Ravi Kumar, Melbourne (AU); Janakiraman Sivasankaran, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 10 days.

(21) Appl. No.: 16/954,045

(22) PCT Filed: Nov. 20, 2018

(86) PCT No.: PCT/DK2018/050300
§ 371 (c)(1),
(2) Date: Jun. 15, 2020

(87) PCT Pub. No.: WO2019/120396
PCT Pub. Date: Jun. 27, 2019

(65) Prior Publication Data
US 2021/0167601 A1   Jun. 3, 2021

(30) Foreign Application Priority Data
Dec. 21, 2017  (DK) .......................... PA 2017 70972

(51) Int. Cl.
*H02J 3/46* (2006.01)
*H02J 3/32* (2006.01)
(Continued)

(52) U.S. Cl.
CPC ............... *H02J 3/32* (2013.01); *G05B 15/02* (2013.01); *H02J 3/381* (2013.01); *H02J 3/46* (2013.01);
(Continued)

(58) Field of Classification Search
CPC ................................................. H02J 13/00002
(Continued)

(56) References Cited

U.S. PATENT DOCUMENTS 9,847,648 B2    12/2017   Shelton et al.
2008/0143304 A1*  6/2008   Bose ........................ H02J 3/06
                                                          323/205
(Continued)

FOREIGN PATENT DOCUMENTS

EP    1933441    6/2008
EP    3188337    7/2017
(Continued)

OTHER PUBLICATIONS

Mallesham et al.,"Optimization of Control Parameters in AGC of Microgrid using Gradient Descent Method" 16th National Power Systems Conference, Dec. 15-17, 2010, pp. 37-42 (Year: 2010).*
(Continued)

*Primary Examiner* — Emilio J Saavedra
(74) *Attorney, Agent, or Firm* — Patterson + Sheridan, LLP

(57) ABSTRACT

A method of controlling a hybrid power plant connected to a power network, the hybrid power plant having a first renewable energy generator and a second renewable energy generator, the first renewable energy generator being configured to generate power using a different source of renewable energy to the second renewable energy generator. The method comprises: determining a target plant power output for the hybrid power plant; determining a target generator power output for each of the first and second generators based on the target plant power output; determining a respective ramp rate for each of the first and second renewable energy generators based, at least in part, on an attribute of the respective renewable energy generator; and operating
(Continued)

each of the first and second renewable energy generators to change its power output to the power network at the determined ramp rate to achieve the target generator power output.

10 Claims, 5 Drawing Sheets

(51) Int. Cl.
  *H02J 13/00* (2006.01)
  *G05B 15/02* (2006.01)
  *H02J 3/38* (2006.01)
(52) U.S. Cl.
  CPC ..... *H02J 13/00002* (2020.01); *H02J 2300/20* (2020.01); *H02J 2300/24* (2020.01); *H02J 2300/28* (2020.01)
(58) Field of Classification Search
  USPC ......................................................... 700/287
  See application file for complete search history.

(56) References Cited

U.S. PATENT DOCUMENTS

2010/0145533 A1 6/2010 Cardinal et al.
2014/0336840 A1 11/2014 Geinzer et al.
2016/0233679 A1 8/2016 Li et al.
2017/0110882 A1* 4/2017 Shelton ................... H02J 3/381
2019/0052088 A1* 2/2019 Johansson ............... H02J 3/382

FOREIGN PATENT DOCUMENTS

WO WO-2016062316 A1 * 4/2016 .............. H02J 3/381
WO WO-2016206696 A1 * 12/2016 ........... F03D 7/0284
WO 2019120396 6/2019

OTHER PUBLICATIONS

National Renewable Energy Laboratory (NREL), "The Importance of Flexible Electricity Supply" US Department of Energy, May 2011, 4 pgs. (Year: 2011).*
Danish Patent and Trademark Office, 1st technical examination for application, PA 2017 70972 Sep. 7, 2018.
Patent Cooperation Treaty, Notification of Transmittal of the International Search Report and the Written Opinion of the International Searching Authority, or the Declaration, dated Feb. 18, 2019, 017P00138WO, PCT/DK2018/050300.

* cited by examiner

POWER CONTROL FOR HYBRID POWER PLANT

TECHNICAL FIELD

The present disclosure relates to a method of controlling active and reactive power in a hybrid power plant. Aspects of the invention relate to a power plant controller for a hybrid power plant, and a hybrid power plant.

BACKGROUND

In order to maximise their generating potential, it is becoming increasingly common for power producers to combine power storage systems and different types of renewable energy generator to form hybrid power plants. For example, a hybrid power plant might typically comprise wind turbine generators, photovoltaic generators, and battery storage systems. To interact with a power network, or power grid, the different types of generator within a hybrid power plant are operated as one, with a single point of interconnection (PoI) connecting the generators to the grid and with the plant as a whole being expected to comply with requirements of the grid specified by a grid operator.

A hybrid power plant controller (HPPC) is incorporated to ensure compliance with the grid requirements by controlling the generators and storage in accordance with instructions received from the grid operator or according to pre-programmed operation. The HPPC monitors electrical parameters of the grid and power plant, and acts to operate the power plant's reactive and active power outputs to achieve steady state control of voltage and frequency respectively. Conventional HPPCs, upon receipt of instructions from the grid operator, generate reference levels for active and/or reactive power to be met by the generators or storage systems in line with pre-set control methods.

However, while HPPCs are able to distribute reference levels to generators, the response differs between different types of generator. In particular, the rates of change of active and/or reactive power output of the generators are fixed at predetermined levels that are well within the capabilities of the generators. Consequently, it is likely that the full capability of each type of generator is under-utilized, and may possibly lead to non-compliance with grid requirements in some situations.

In extreme cases, the fixed response has the potential to cause problematic oscillations of grid voltage or to cause other instabilities of the grid.

Therefore, there exists a need for a control method for a hybrid power plant that utilizes the full capabilities of the available generators while ensuring compliance with grid requirements and stability of the grid. It is an aim of the present invention to address this need.

SUMMARY OF THE INVENTION

According to an aspect of the present invention there is provided a method of controlling a hybrid power plant, the hybrid power plant having a first renewable energy generator and a second renewable energy generator, the first generator being configured to generate power using a different source of renewable energy to the second generator. The method comprises: determining a target plant power output for the hybrid power plant; determining a target generator power output for each of the first and second generators based on the target plant power output; determining a respective ramp rate for each of the first and second generators based, at least in part, on an attribute of the respective generator; and operating each of the first and second generators to change its power output at the determined ramp rate to achieve the target generator power output.

Advantageously, determining a ramp rate for each renewable energy generator based on an attribute of the renewable energy generator, and then operating the renewable energy generators according to the determined ramp rates facilitates a highly adaptive system, that can meet power requirements much more quickly or slowly than would be possible with pre-set ramp rates.

Furthermore, adapting ramp rates based on an attribute of the respective renewable energy generator ensures that, where specific renewable energy generators are able to operate or react faster or more slowly than others, the correct output from the hybrid power plant can be achieved.

For example, hybrid power plants may comprise wind turbine generators and photovoltaic cells. Photovoltaic cells are typically able to operate at higher and lower power ramp rates than wind turbine generators.

The method may comprise monitoring at least one trigger condition. The step of operating each of the first and second renewable energy generators to change its power output at the determined ramp rate to achieve the target generator power output may be performed only if the at least one trigger condition is fulfilled.

By implementing a trigger condition, beneficially enables the method to be used only when circumstances require, so that the hybrid power plant can be operated in compliance with the grid requirements, or so that problematic circumstances can be avoided.

The method may comprise operating each of the first and second renewable energy generators to change its power output at a preset ramp rate to achieve the target generator power output if the trigger condition is not fulfilled.

Monitoring the at least one trigger condition may comprise comparing a short-circuit ratio of the power network with a predetermined threshold. The trigger condition may be fulfilled if the short-circuit ratio is below the threshold.

Monitoring the at least one trigger condition may comprise comparing rate of change of frequency level of the power network with a predetermined threshold. The trigger condition may be fulfilled if the rate of change of frequency exceeds the predetermined threshold.

The method may comprise monitoring at least one inhibit condition. The step of operating each of the first and second renewable energy generators to change its power output at the determined ramp rate to achieve the target generator power output may be performed only if the inhibit condition is not fulfilled. The inhibit condition may take precedence over the trigger condition.

The method may comprise operating each of the first and second renewable energy generators to change its power output at a preset ramp rate to achieve the target generator power output if the inhibit condition is fulfilled.

Inhibit conditions are particularly beneficial by implementing a safeguard for the renewable energy generators. Inhibit conditions restrict the implementation of an adaptive ramp rate if its implementation would endanger the safe operation of one or more of the renewable energy generators.

The inhibit condition may be based on an operational parameter of at least one of the renewable energy generators.

The attribute of the renewable energy generator according to which the respective ramp rate is determined may be a type of the renewable energy generator.

The respective ramp rate for each of the first and second renewable energy generators may also be based on a monitored parameter of the hybrid power plant or the power network. The monitored parameter may be rate of change of frequency.

The first renewable energy generator may comprise a wind turbine generator. The second renewable energy generator may comprise a photovoltaic cell.

The hybrid power plant may further comprise a battery unit. The method may comprise determining a target generator power output for the battery unit based on the target plant power output. The method may comprise determining a ramp rate for the battery unit. The method may comprise operating the battery unit to change its power output to the power network at the determined ramp rate to achieve the target generator power output.

The power outputs may be for reactive power, active power, or both. Thus, the method is particularly advantageous because, being applicable to both reactive power and active power, hybrid power plants can be operated with high flexibility according to grid conditions or requirements.

According to another aspect of the present invention, there is provided a power plant controller configured to control a hybrid power plant according to the method described above.

According to another aspect of the present invention, there is provided a computer program product downloadable from a communication network and/or stored on a machine readable medium, comprising program code instructions for implementing the method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
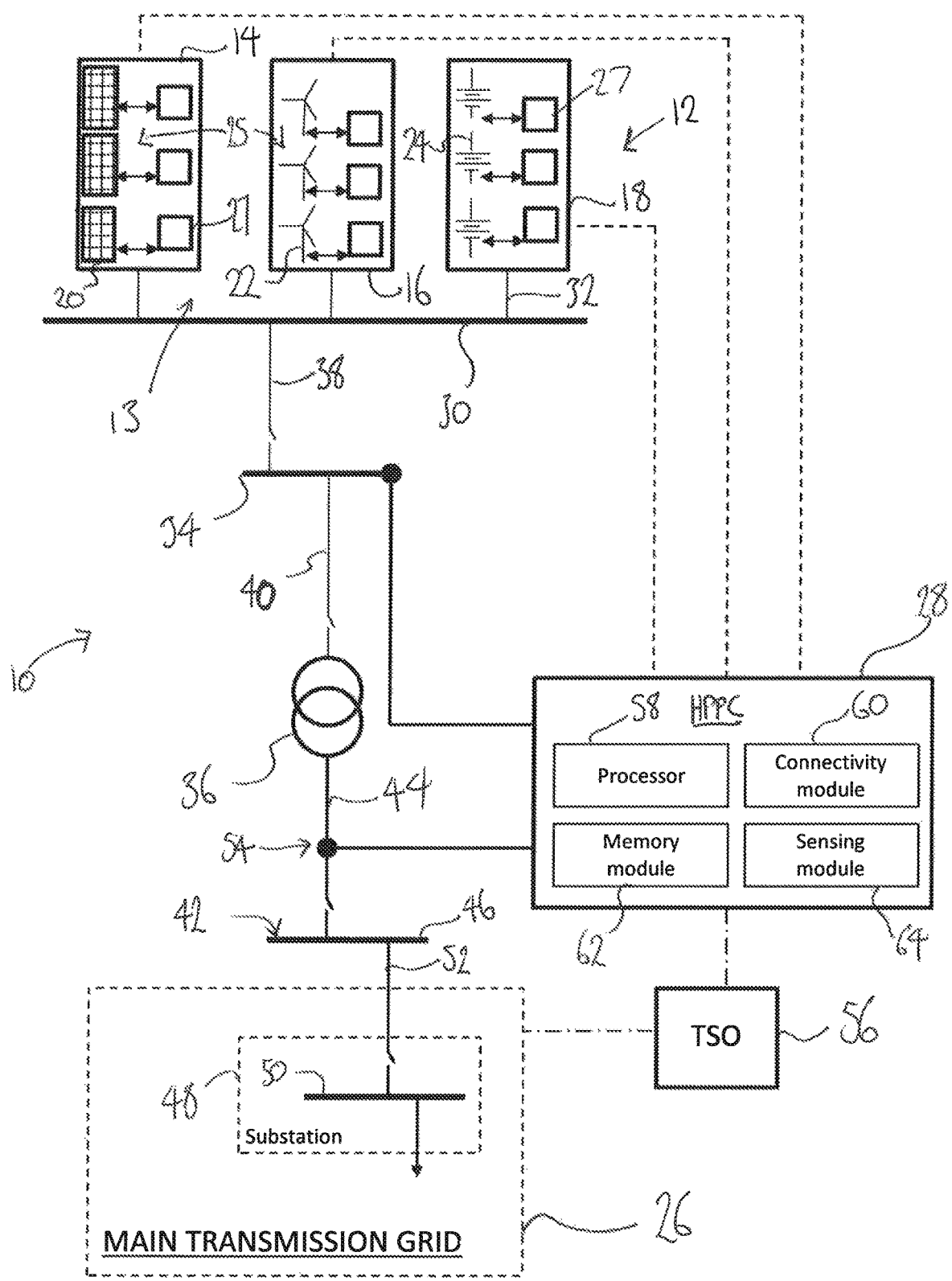
FIG. 1 is a schematic representation of a hybrid power plant, its connection to a grid, and its control system.

FIG. 1 illustrates a typical architecture in which a hybrid power plant (HPP) is connected to a main transmission grid as part of a wider power network and comprises three sub-plants: a battery storage system, photovoltaic generators, and wind turbine generators. The same example set-up is used in FIG. 2. As will be understood by the skilled reader, a HPP is a power plant that is capable of generating electrical energy from at least two different renewable energy sources. Thus, the examples shown in the figures are representative only and the skilled reader will appreciate that other specific architectures of HPPs are possible. For example, it is possible that more than three sub-plants may be incorporated into a HPP, or the HPP may comprise two sub-plants only.

Furthermore, it will be understood by the skilled reader that a sub-plant forming the HPP may be formed by a single generator. Therefore, as a sub-plant may comprise a single generator and a hybrid power plant requires two or more sub-plants, a hybrid power plant may be defined as a power plant incorporating at least two renewable energy generators, in which the power generated by the power plant is generated from at least two different sources of renewable energy.

The skilled reader will appreciate that methods, systems and techniques also described below may be applicable to many different configurations of power network. Moreover, the components of the hybrid power plant and power network are conventional and as such would be familiar to the skilled reader. It is expected that other known components may be incorporated in addition to or as alternatives to the components shown and described in FIG. 1 or 2. Such changes would be within the capabilities of the skilled person.

Considering the figures in more detail, FIG. 1 shows a power network 10 incorporating a HPP 12. The HPP 12 includes three sub-plants 13: a solar power sub-plant 14, a wind power sub-plant 16, and a battery storage sub-plant 18. The solar sub-plant 14 comprises a plurality of photovoltaic (PV) generators 20, more commonly called PV cells, configured to convert solar energy into electrical energy. The wind sub-plant 16 comprises a plurality of wind turbine generators (WTGs) 22 configured to convert wind energy into electrical energy. The battery sub-plant 18 comprises at a plurality of electrochemical battery units 24, lithium-ion storage units for example, operable to store and release electrical energy as required. Single WTGs 20, PV cells 22, or battery units 24 would also be possible in each of these sub-plants 14, 16, 18. The electrical energy generated or released by each sub-plant 14, 16, 18 is transferred to a main transmission network or main grid 26, as active current, for distribution.

For simplicity, battery units 24, WTGs 22, and PV cells 20 will be referred to collectively as 'generators' 25 hereafter, unless reference to an individual one of these is required, in which case it will be indicated which is being referred to. Using this definition, each sub-plant 13 may be considered to incorporate at least one generator 25, each generator 25 generating power from a renewable energy source or from storage.

Each of the generators 25 within the sub-plants 13 of FIG. 1 is associated with a respective generator controller 27. In some embodiments, a sub-set of generators 20, 22, 24, such as those within the wind power sub-plant 22, may share a single, semi-centralised controller, such that there are fewer generator controllers than generators. As would be apparent to the skilled person, generator controllers 27 can be considered to be computer systems capable of operating a PV cell 20, WTG 22 and/or battery unit 24 in the manner prescribed herein, and may comprise multiple modules that control individual components of each generator 25.

During normal operation of the HPP 12, the generator controllers 27 operate to implement active and reactive current requests received from a hybrid power plant controller (HPPC) 28 at their respective generator(s) 25. During extraordinary conditions, the generator controllers 27 operate to fulfil predetermined network requirements, and also act to protect the generators 25 from any potentially harmful conditions.

Within each sub-plant 13, each of the generators 25 is connected to a local grid (not shown) that links the generators 25. Each of the sub-plants 13 is, in turn, suitably connected to a collector bus 30 via a respective feeder line 32. The collector bus 30 may be at a voltage level that is suitable for relatively short distance power transmission, for example in the region of 10 kV to 150 kV, most usually between 110 kV and 150 kV.

The collector bus 30 is connected to a medium voltage bus 34, which in turn is connected to a main step-up transformer 36. The collector bus 30, medium voltage bus 34 and main step-up transformer 36 are connected by transmission lines 38, 40. The main transformer 36 is in turn connected to the main grid 26 at a Point of Interconnection (PoI) 42 by another transmission line 44. The PoI 42 is an interface between the HPP 12 and the main grid 26 and comprises a PoI bus 46 whose nominal voltage level is higher than that of the collector and medium voltage buses 30, 34.

While the collector and medium voltage buses 30, 34 may be required to span distances up to around 100 km, the main grid 26 and PoI bus 46 may be an international, national, or regional grid such as the National Grid of Great Britain, for example, and therefore may be required to span distances of up to around 250 km or more. Accordingly, the voltage level of the main grid 26 and the PoI bus 46 may be much higher than the voltage level of the collector and the medium voltage buses 30, 34 for better transmission efficiency. As such, the main transmission grid 26 may comprise a plurality of substations and additional buses operating at different voltages as well as further transformers to increase the voltage for improved transfer of power. The transmission grid 26 shown in FIG. 1 includes at least one substation 48 and an associated feeder bus 50, connected to the PoI bus 46 by a transmission line 52.

The connecting lines such as the transmission and feeder lines 32, 38, 40, 44, 52 may each include a protection system to protect individual components from damage during or following extreme conditions. For example, it is envisaged that at least an appropriate circuit breaker will be included in each line.

Hereinafter, it should be assumed that references to components being connected or connections between components comprise suitable feeder or transmission lines as described above unless it is otherwise indicated.

A Hybrid Power Plant Controller (HPPC) 28 is connected to the power network 10 at a Point of Measurement (PoM) 54 and is also connected directly to each of the sub-plants 13 of the HPP 12. The role of the HPPC 28 is to act as a command and control interface between the HPP 12 and the grid 26, and more specifically, between the sub-plants 13 and a grid operator or transmission system operator (TSO) 56. The HPPC 28 is a suitable computer system for carrying out the controls and commands as described above and so incorporates a processor 58, a connectivity module 60, a memory module 62, and a sensing module 64. The HPPC 28 may also receive information regarding the grid 26 and/or the local buses 30, 34, 42, 50, substations 48 and networks from an energy management system (not shown).

The HPPC 28 is connected to the transmission line 44 between the main transformer 36 and the PoI bus 46 at the PoM 54 to allow monitoring and regulation of the output of the HPP 12 and to interpret the power demands correctly. The HPPC 28 is also connected to the medium voltage bus 34 to measure a variety of parameters that are representative of the state of the grid 26 and HPP 12, and that can be used to improve the outputs of the HPP 12 to best meet the requirements of the TSO 56 or as set out in a set of grid-specific requirements.

The HPPC 28 is equipped to measure a variety of parameters including a representative power output that will be supplied to the main grid 26 at the PoI 42 by the HPP 12. As the PoM 54 is not at the PoI 42, the measured parameters are only representative as losses in the lines between the PoM 54 and PoI 42, and between the PoM 54 and the HPPC 28, may have an effect on the measurements. Suitable compensation may take place to account for the losses to ensure that the measurements are accurate.

The HPPC 28 measures parameters of the power output such as reactive and active power exchange between the HPP 12 and the main grid 26, and the voltage level of the main grid 26. The HPPC 28 compares the measured parameters against specific grid requirements and, in a suitable manner, communicates control commands to specific components of the HPP 12 accordingly. The sub-plants 13 of the HPP 12 are capable of altering their power output in reaction to commands received from the HPPC 28. It will be noted that FIG. 1 is a schematic view, so the way in which the control commands are transferred is not depicted explicitly. However, it will be appreciated that suitable cabling may be provided to interconnect the HPPC 28 and the sub-plants 13, generators 25 or generator controllers 27. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

Figure 2:
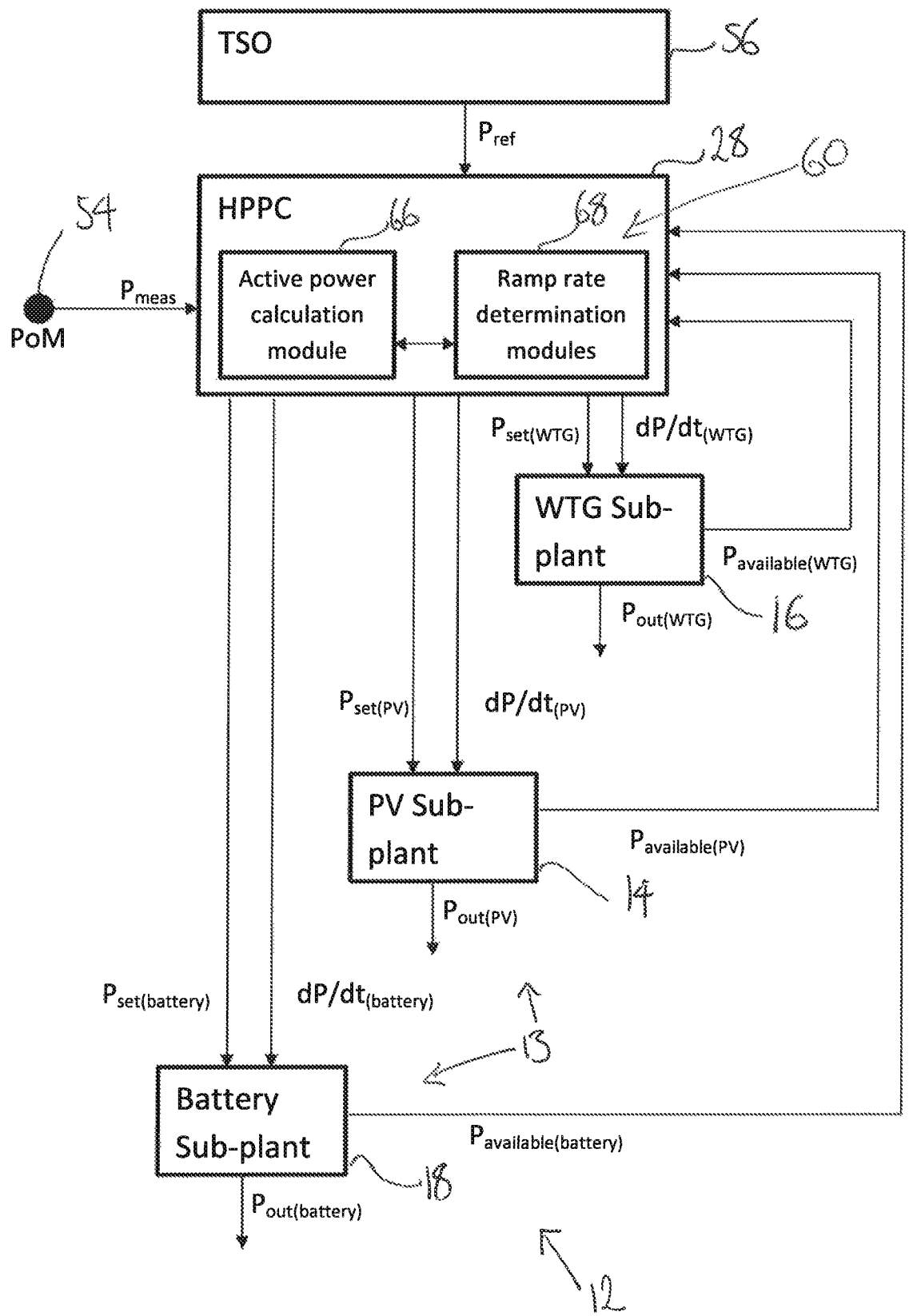
FIG. 2 is a schematic representation of the communication among the control systems of the hybrid power plant according to an embodiment of the invention.

As discussed above, the HPPC 28 manages the HPP 12 according to a set of grid requirements that are specific to the main grid 26. Specific circumstances require different modes of operation. FIG. 2 illustrates the flow of information between components in FIG. 1 required to implement such modes of operation.

Figure 3:
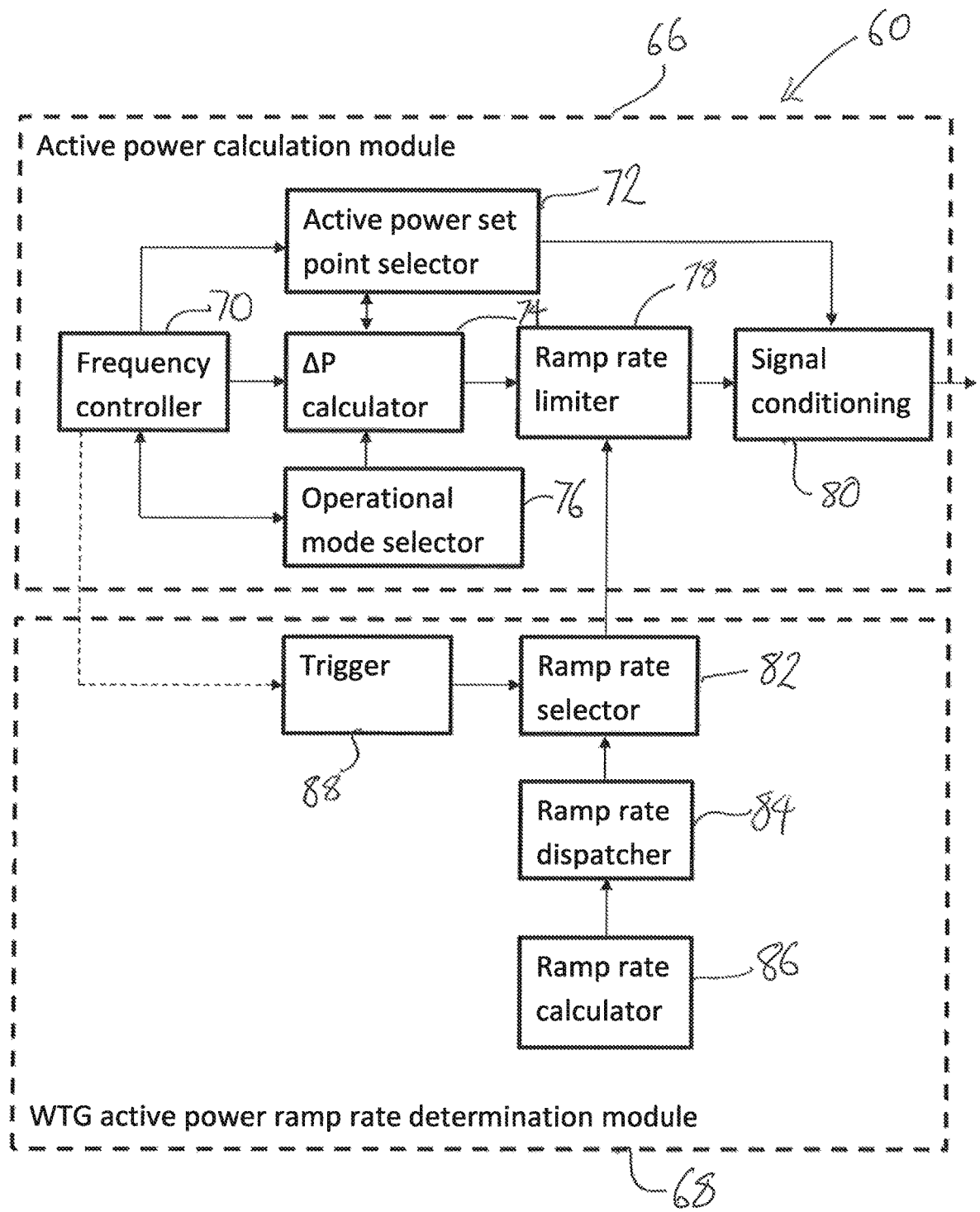
FIG. 3 is schematic representation of active power control modules of a hybrid power plant controller according to an embodiment of the invention.
Figure 4:
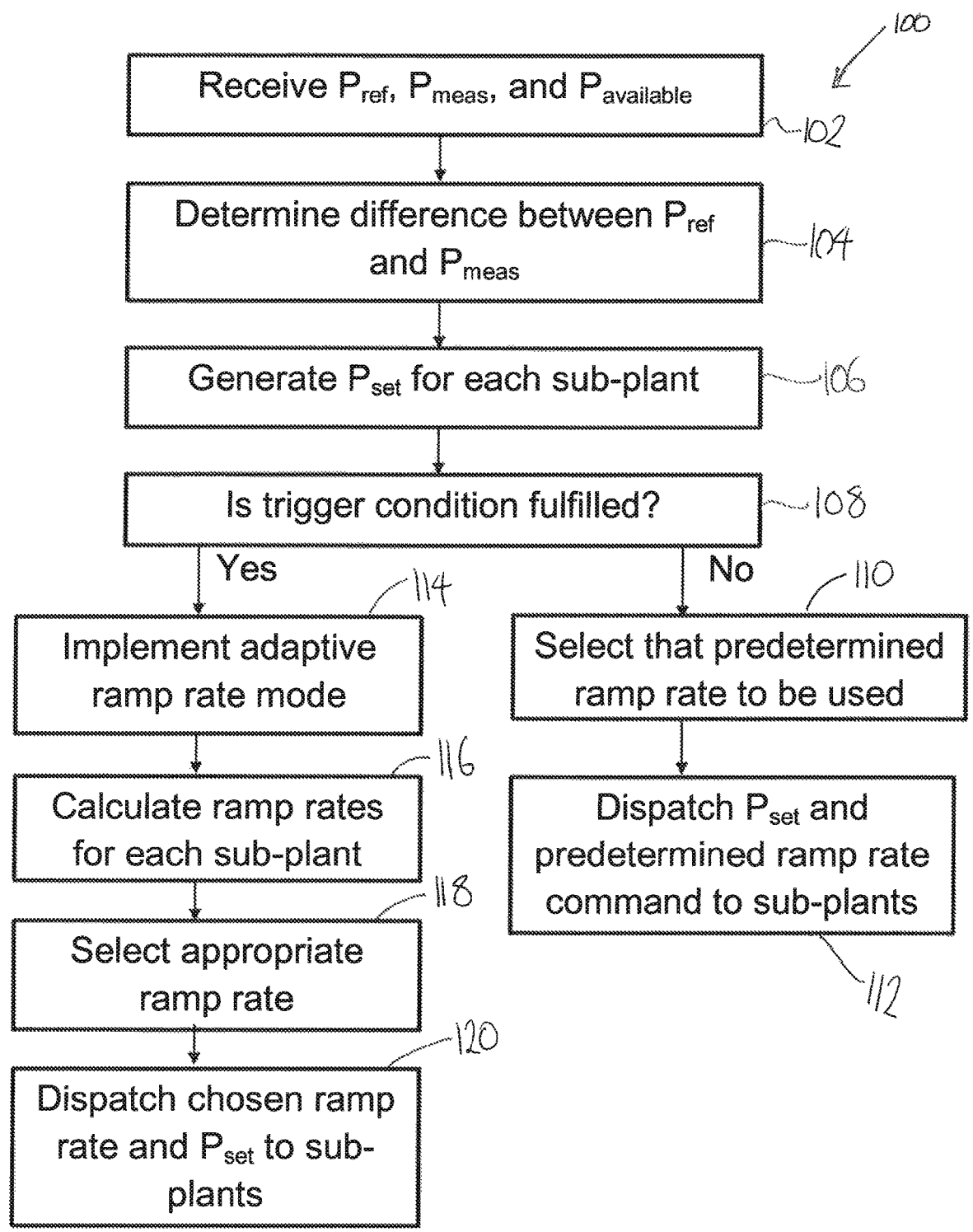
FIG. 4 is a flow chart governing the operation of a hybrid power plant according to an embodiment of the invention.
Figure 5:
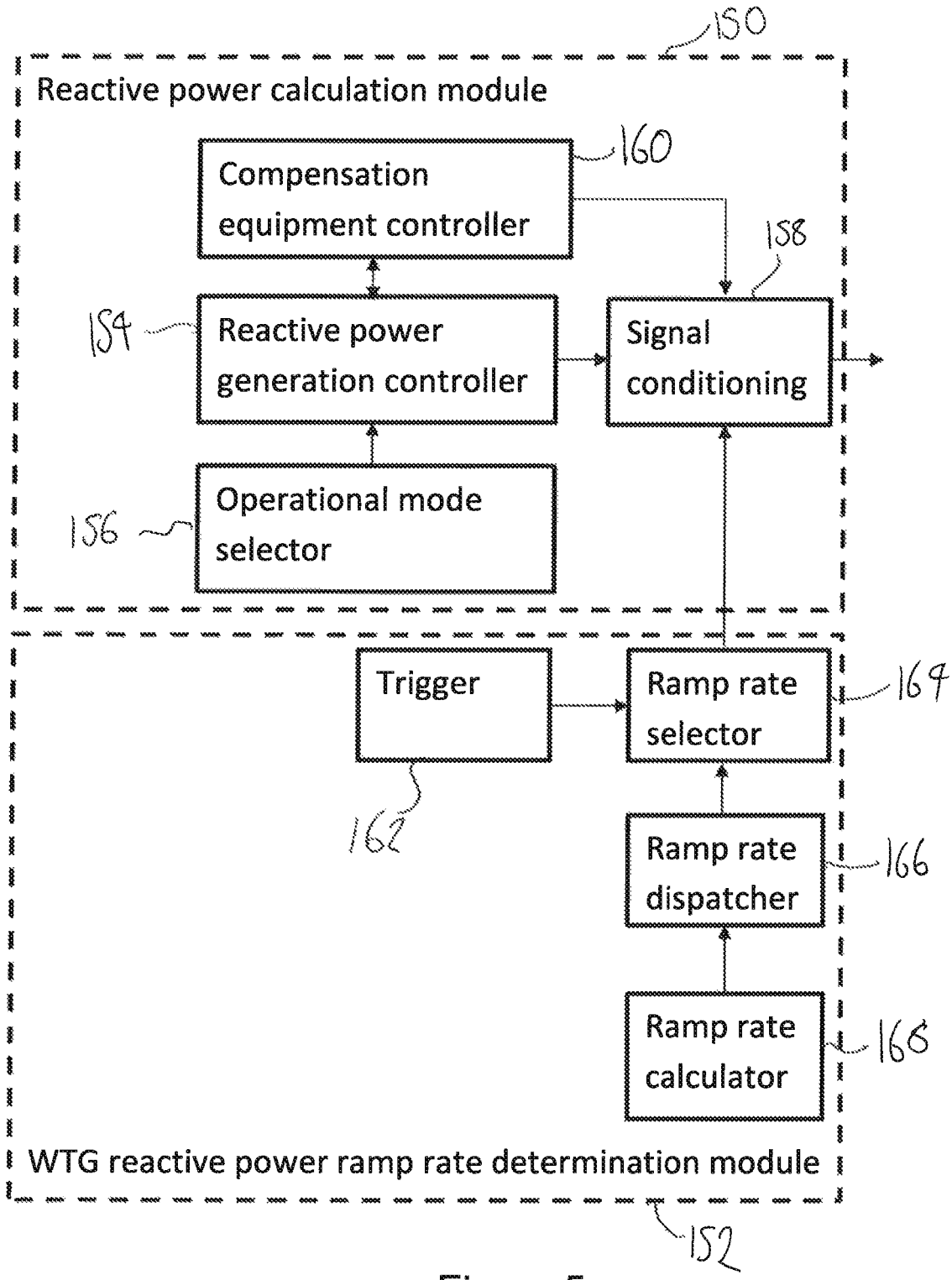
FIG. 5 is a schematic representation of reactive power control modules of a hybrid power plant controller according to an embodiment of the invention.

FIGS. 2 to 4 illustrate embodiments of the network 10 that relate to active power generation, while FIG. 5 relates to a configuration for the reactive power control the within a HPPC according to an alternative embodiment. It will be appreciated that the invention relates to both active and reactive power generation and, therefore, aspects in the discussion below in relation to FIGS. 2 to 4 are equally applicable to reactive power. Where specific differences apply between the application of the invention in respect of reactive power, these differences will be indicated accordingly. Otherwise, it should be assumed that where active power is referred to, the principles, methods and/or systems may be implemented in a similar manner for reactive power generation.

FIG. 2 shows the flow of information, such as measured parameters and operational commands, between the TSO 56, PoM 54, HPPC 28, and sub-plants 14, 16, 18 of the HPP 12. Modules 66, 68 of the processor 58 of the HPPC 28 are also shown schematically in FIG. 2. The structure and operation of the modules of the processor 58 shown in FIG. 2 will be discussed later in more detail in relation to FIG. 3.

Initially focussing on FIG. 2, the HPPC 28 receives a plurality of inputs relevant to the control of active power from the TSO 56, the PoM 54, and from each sub-plant 13. In particular, the HPPC 28 receives an active power reference level, $P_{ref}$, from the TSO 56, a measured active power level, $P_{meas}$, from the PoM 54, and an available active power capacity of the generators 25 of each sub plant 13, $P_{available}$, from the sub-plants 13. In some embodiments, a reference level may alternatively be determined by the HPPC 28 by reference to predetermined requirements rather than being received from a TSO 56. More generally, the HPPC 28 can be considered to determine a reference level, which may also be considered to be a target power output for the plant.

In addition, frequency requirements and measurements may also be received by the HPPC 28 to permit the HPPC 28 to control active power output according to frequency requirements as well, although these are not depicted here.

The HPPC's processor 58 comprises an active power calculation module 66 in communication with active power ramp rate determination modules 68. The HPPC processor 58 will include a plurality of ramp rate determination modules 68, each being specific to a sub-plant 13 of the HPP 12. The HPPC processor 58 will also include a reactive power ramp rate determination module for each sub-plant 13 and a reactive power calculation module, whose operations are similar to the active power modules 66, 68. The reactive power modules are not shown in FIG. 2.

Using the active power reference level, $P_{ref}$, received by the HPPC 28 from the TSO 56, the measured active power level, $P_{meas}$, and the fed-back available active power levels from each of the sub-plants 13, $P_{available}$, the HPPC 28 generates active power set points, $P_{set}$, for each sub-plant 13 at its active power calculation module 66. While the reference level is intended to be a target power output for the HPP 12 to inject into the main grid 26, the set points are considered to be target or destination power output levels for the sub-plants 13, or for individual generators 25 to meet. The HPPC 28 varies the set points to demand active power from the sub-plants 13 according to their available capacity.

The HPPC 28 also determines a bespoke ramp rate for each sub-plant 13 using the ramp rate determination modules 68, provided a trigger condition is enabled. Enablement of the trigger will be discussed later. The ramp rates are each labelled dP/dt in FIG. 2. Each of the determined ramp rates and active power set points are then communicated to the relevant sub-plant 13 using the HPPC's connectivity module 60, and the sub-plants 13 consequently operate, or are operated, to meet both the specified ramp rate and to change their active power output, $P_{out}$, towards their specified set point accordingly.

So, the HPPC 28 receives active power reference, or target, levels from the TSO 56, active power measurements from the PoM 54, and available active power capacity from each of the battery sub-plant 18, the PV sub-plant 14, and the WTG sub-plant 16. Using these parameters, and possibly others including frequency measurements and set points, the HPPC 28 generates active power set points and ramp rates for each of the sub-plants 13. To the WTG sub-plant 16, an active power set point, $P_{set(WTG)}$, and a ramp rate $dP/dt_{(WTG)}$ are communicated. To the PV sub-plant 14, an active power set point, $P_{set(PV)}$, and a ramp rate $dP/dt_{(PV)}$ are communicated. To the battery sub-plant 18, an active power set point, $P_{set(battery)}$, and a ramp rate $dP/dt_{(battery)}$ are communicated. Similarly, reactive power set points and ramp rates specific to each sub-plant 13 are communicated as required.

In turn, the WTG sub-plant 16 feeds its available active power, $P_{available(WTG)}$, back to the HPPC 28, and operates to output an active power level, $P_{out(WTG)}$, which changes according to the received ramp rate, with the intention of converging upon the active power set point that was also communicated to it. Similarly, the PV sub-plant 14 and battery sub-plant 18 feed their available active power, $P_{available(PV)}/P_{available(battery)}$ back to the HPPC 28, and operate to output active power levels, $P_{out(PV)}/P_{out(battery)}$, which change according to the received ramp rate, with the intention of converging upon the respective active power set point target levels that were also communicated to them.

The operation of the HPP 12 described above is in contrast to conventional, known operation of a hybrid power plant, in which a hybrid power plant controller receives an active power reference level from a TSO, as well as measured active power levels, and calculates a difference between the measured and reference levels. From the received available active power levels, an active power set point is calculated for each sub-plant to meet, and these set points are communicated to the sub-plants, which change their active power output levels according to a preset, non-variable ramp rate, such that their output level changes from the initial level to a destination level within a predictable time period.

Thus, the conventional power output from sub-plants of HPPs results in an under-utilisation of the available resources, and often a slower response than could actually be achieved. Conversely, where very slow responses are required, the conventional approach may result in an output that ramps too quickly. The bespoke ramp rates generated according to the present invention are suitable for the type of generator 25 in each sub-plant 13, taking into account the operational characteristics that dictate how a generator 25 is able to change its output. These ramp rates are also able to take into account operational characteristics of the power network 10 and main grid 26 more generally so as to allow full compliance. Thus, implementing a variable and adaptive mix of ramp rates that depend upon the capability of the generator 25, and on the requirements for the mode of operation of the HPP 12, achieves a more efficient, suitable, and compliant HPP 12.

Bespoke ramp rates are generated for each sub-plant 13 because of and based on the different attributes of the generators 25, and particularly because of the different types of generator 25, and because of differences in how the generators 25 extract power from their respective sources. For example, because a WTG 22 has many more moving parts than a PV cell 20 or battery unit 24, relying upon a torque generated by wind energy, the speed with which a WTG 22 can increase or decrease its output power levels is typically slower than the speeds that are achievable using PV cells 20 or battery units 24. The ramp rate capabilities of WTGs 22 may be affected by mechanical speed and/or drive train constraints, while the capability of a PV cell 20 may be dependent upon the available surface area exposed to solar radiation. Battery units may be reliant on their state of charge. Other differences between WTGs 22, PV cells 20 and battery units 24, or other renewable energy sources if available, may dictate the rate of change of power levels.

Considering the modules 66, 68 of the HPPC 28 in slightly more detail, FIG. 3 schematically illustrates the active power calculation module 66 and one of the active power ramp rate determination modules 68, specifically the module for a wind-powered sub-plant. The operational principles for the modules are similar for reactive power generation, and so the modules shown in FIG. 3 may also be used for reactive power adaptive ramp rate implementation, with appropriate changes such as including a voltage controller rather than a frequency controller. An alternative embodiment having a reactive power calculation module and reactive power ramp rate determination module is described later in relation to FIG. 5.

In FIG. 3, the active power calculation module 66, which is considered to be known and so is only described briefly here, comprises a frequency controller 70 that receives frequency parameters such as set points and measurements, and distributes information to each of an active power set point selector 72, a ΔP calculator 74, and an operational mode selector 76. The frequency controller 70 may distribute a difference in frequency between the measured frequency of the grid 26 and the frequency set point, indicating that a change in active power output from the HPP 12 is required to support the frequency of the grid 26. Also included in this module 66 are a ramp rate limiter 78, and a signal conditioning unit 80.

Based on the output from the frequency controller 70, the operational mode selector 76 provides input to the frequency controller 70 and ΔP calculator 76 to influence the required set points.

As discussed in relation to FIG. 2, the active power calculation module 66 also receives inputs as active power parameters, and these are received at its active power set point selector 72. The parameters are communicated to the AP calculator 74, which calculates a difference between the required and measured active power levels, and communicates this back to the set point selector 72, and to the ramp rate limiter 78.

The set point selector 72 then generates set points for each sub-plant 13 based upon the calculated difference, the frequency controller's output and the received active power parameters. These are communicated to the signal conditioning unit 80 for dispatching to the sub-plants 13 along with a selected ramp rate.

In conventional power plants, where no ramp rate determination module 68 is present, the ramp rate limiter would act only to limit the ramp rate if particular operational criteria are exceeded.

In the present invention, the ramp rate limiter 78 receives a further input in addition to the difference between the reference and the measured active power level. This further input is received from the ramp rate determination module 68, in the form of a selected, bespoke ramp rate or a command to use a preset ramp rate. Selected, bespoke ramp rates are selected based upon a variety of criteria, including attributes of the generator(s) 25 of each sub-plant 13. Whether the bespoke or preset ramp rate is used is based on a trigger condition as will be described later.

Once the ramp rate limiter 78 has received inputs from the calculator 74 and ramp rate module 68, it distributes either the bespoke ramp rate or the command to use the preset to a signal conditioning unit 80. The ramp rate and set points received by the signal conditioning unit 80 are then dispatched to the individual sub-plants 13, as shown in FIG. 2. The signal conditioning unit 80 performs the function of generating signals that are in the correct format for implementation by the sub-plants 13.

In particular, if a bespoke ramp rate is received, the limiter 78 is effectively bypassed or disabled such that the bespoke ramp rate passes directly through to the signal conditioning unit 80 before being output. On receiving a command that the preset ramp rate is to be used, the ramp rate limiter 78 may act to implement a limitation on the preset ramp rate if necessary.

The ramp rate for each sub-plant 13 is determined by its ramp rate determination module 68, which is also shown in FIG. 3. The ramp rate determination module 68 includes a ramp rate selector 82, a ramp rate dispatcher 84, a ramp rate calculator 86 and a trigger 88. The ramp rate selector 82 distributes a ramp rate to the ramp rate limiter 78 as required, where the ramp rate that is distributed is dependent upon whether the trigger 88 is in an active state or not.

To put this another way, if a monitored criteria or condition is met at the trigger 88, the ramp rate selector 82 is able to enable the use of an adaptive, determined ramp rate, provided to it by the ramp rate dispatcher 84, and as calculated by the ramp rate calculator 86. The 'enablement state' of the trigger 88 is effectively an instruction to utilise the calculated ramp rates from the ramp rate calculator 86. On the other hand, if the trigger 88 adopts an 'inhibit state', such that the criteria or condition for adaptive ramp rate selection is not met, or if an inhibit condition is identified, the selector 82 effectively ignores the calculated adaptive ramp rate, and instead distributes a command to utilise the sub-plant's preset ramp rate, effectively performing an override function. The ramp rate selector 82 may alternatively distribute the preset ramp rate itself.

Thus, there are at least two choices of ramp rate available to the selector 82: a determined ramp rate and a preset ramp rate. The determined ramp rate is determined by the calculator 86 based on at least an attribute of the generators 25, and is adaptive such that it may be altered based on monitored parameters. The preset ramp rate is a value that is effectively hard-wired into the generator 25 or controller 28 prior to installation, or that, at the very least, is not determined in real-time according to measured parameters or attributes of the generators 25 as the determined rate is.

The ramp rate dispatcher 84 and calculator 86 operate to generate adaptive ramp rates and provide these to the selector 82 periodically. It will be appreciated that ramp rates may be provided only on request by the calculator 86 and dispatcher 84, or that the calculation may be influenced by the operation of the trigger 88.

The ramp rate calculator 86 utilises monitored attributes and calculates ramp rates accordingly. In one embodiment, the ramp rate calculator 86 may utilise a plurality of threshold values to identify a set of ramp rates that apply to the attribute of generator type, communicating the set of ramp rates to the dispatcher 84 and/or selector 82, or even just a single ramp rate. Therefore, the ramp rate calculator 86 may utilise a look-up table, or a model of the power network 10 to determine appropriate ramp rates, or may use a predetermined logic to determine an operating mode, according to which the ramp rates are set.

As used herein, the 'type' of generator is defined by the source of the energy that is converted by generator into electrical energy. Types of generator may include wind turbine generators, battery units, or photovoltaic cells.

An example look-up table is shown below, in which three threshold values for rate of change of frequency are used with ramp rates being set for each type of generator 25:

| Rate of change of frequency | Ramp Rate (WTG) | Ramp Rate (battery) | Ramp Rate (PV) |
| --- | --- | --- | --- |
| 1.0 | 0.1 | 0.05 | 0.1 |
| 1.5 | 0.15 | 0.2 | 0.2 |
| 2 | 0.2 | 0.3 | 0.4 |

It will be appreciated that each of the ramp rates provided in the above table are provided in per-unit format. As would be understood by the skilled person, per-unit active power is an expression of the active power with respect to a base value which is used as a reference. Similarly, per-unit reactive power, or per-unit voltage is an expression of the reactive power/voltage with respect to a reference base value. Using a per-unit system allows for normalization of values across transformers and other components that may change the value by an order of magnitude.

The function of the ramp rate dispatcher 84 is to communicate the calculated ramp rate to the selector 82. The effective gain of the ramp rate dispatcher 64 is 1.

Returning to FIG. 3, the trigger's enablement state is entered if a criterion is met. One criterion for active power adaptive ramp rate selection to be triggered is a threshold value being reached for a short-circuit ratio, which may indicate that there is a weak grid interconnection between the HPP 12 and the main grid 26. In weak grid interconnections, fast ramp rates are discouraged as they are likely to result in dangerous voltage oscillations.

A SCR for the network 10 can typically be determined for the network at the medium voltage bus 34. The SCR can be calculated in real-time by measuring the voltage level change for a given reactive power change at the medium voltage bus 34 and the SCR is given as the ratio of this reactive power change to the voltage level change. These values are typically sampled over a short sampling window. The SCR may also be measured at other busses 42, 50 downstream of the medium voltage bus 34

In some embodiments, the threshold SCR value for enabling selection of an adaptive ramp rate is 3.0. In other embodiments, the threshold value is less than 3.0. For example, the threshold may be a value between 3.0 and 2.5. In exceptional circumstances, the threshold value may be lower than 2.5.

An alternative trigger criterion may be the rate of change of measured frequency of the main grid meeting a predetermined threshold. High rate of change of frequency may require fast changes in active power, while low rates of change of frequency require slower changes in active power. A plurality of threshold values may be used to implement different ramp rates as necessary.

If the enablement criteria are not met, then the ramp rate selector 82 is inhibited from sending the adaptive ramp rates, instead sending a command to use predetermined rates. There may also be some inhibit conditions, which act to maintain the trigger 88 in the inhibit state even if the enablement criteria are met. In other words, inhibit conditions take precedence over trigger conditions. For example, for a wind sub-plant 16, operation of WTGs 22 above a threshold speed may be used as an inhibit condition, or other mechanical constraints, while PV cells 20 of PV sub-plants 14 may be limited by thermal constraints and battery units 24 in battery sub-plants 18 by state of charge and/or thermal constraints. Other operational parameters may be used.

The process for distributing ramp rates and set points to the sub-plants is shown as a flow chart in FIG. 4, and will now be discussed, whilst also referring back to FIGS. 2 and 3.

In the method 100, the new $P_{meas}$, $P_{available}$, and $P_{ref}$ values are received 102 by the HPPC 28. The $P_{ref}$ values are received from either the TSO 56 or from an internal memory 62 that includes the grid requirements that the HPP 12 is required to meet. The difference between the $P_{ref}$ and $P_{meas}$ is determined 104 by the ΔP calculator 74 of the HPPC's active power calculation module 66.

Based on the determined difference, and the $P_{available}$ values for each sub-plant 13, the HPPC generates 106 new $P_{set}$ values for each of the sub-plants 13 to meet. The $P_{set}$ values for each sub-plant 13 will together result in output to the grid 26 that meets the required, target level specified as $P_{ref}$ in the initial step 102 of the method 100.

At the next step 108, a query is performed, to determine whether the trigger condition is fulfilled. The fulfilment of the trigger condition is here intended to mean that the criteria for the enablement state to be entered is met, and that there are no inhibit conditions present that restrict the enablement of the ramp rate selector 82 to select a ramp rate provided by the ramp rate calculator 86.

If the condition is not fulfilled, i.e. the enablement criterion is not met, or an inhibit condition is present, then the ramp rate selector 82 does not utilise the calculated adaptive ramp rate, instead selecting 110 that a predetermined ramp rate should be used and dispatching 112 this command to the signal conditioning unit 80 and, consequently, the sub-plants 13. The generated active power set point for each sub-plant 13, $P_{set}$, is also dispatched 112 to the sub-plants 13 along with this command.

If the condition is fulfilled, such that the trigger enters its enablement state, an adaptive ramp rate mode can be considered to have been entered 114. The ramp rates for each sub-plant 13 are calculated 116 by the ramp rate calculator 86, and the correct or appropriate ramp rate is selected 118 by the ramp rate selector 82, i.e. the ramp rate calculated by the calculator 86. This chosen ramp rate and the $P_{set}$ values are then distributed 120 to the appropriate sub-plants, via the limiter 78 and signal conditioning unit 80.

The trigger 88 acts to monitor the parameters by which it inhibits or enables operation of the selector 82, either continuously or periodically, so that a new ramp rate can be distributed 120 when necessary.

While it is expected when the ramp rates and set points are initially dispatched that the target output for the sub-plants 13 will be reached, it is entirely possible that new grid conditions or new reference levels may require an alteration of the ramp rates or set points. In these circumstances, the ramp rate calculator 86 may generate new ramp rates to be selected by the selector.

FIG. 5 schematically illustrates an alternative embodiment for reactive power modules 150, 152 of the processor 58, these modules 150, 152 being responsible for reactive power control. As shown in this figure, the processor 58 comprises a reactive power calculation module 150 and a reactive power ramp rate determination module 152 for each sub-plant 13, only one of which is shown.

In this embodiment, the reactive power calculation module 150 comprises a reactive power generation controller 154, capable of generating target set point outputs based upon received measurements, available generation capacity, and reference levels received from a TSO 56. The set points, and general operation of the generation controller 154 may also be based upon an operational mode selected by the operational mode selector 156.

The generation controller 154 communicates the relevant generated set points to the signal conditioning unit 158 for dispatching to the signal conditioning unit 158. The reactive power generation controller 154 also communicates with a compensation equipment controller 160 to identify how much compensation equipment is required, and to prepare the equipment to compensate reactive power accordingly. The compensation equipment also dispatches set points and commands to the signal conditioning unit 158 for dispatch.

Moreover, the processor 58 also comprises reactive power ramp rate determination modules 152 for each sub-plant 13. Each of these ramp rate determination modules 152 has a similar structure and make-up to the active power ramp rate determination modules 68 described above, comprising a trigger 162, a ramp rate selector 164, a ramp rate dispatcher 166, and a ramp rate calculator 168. The reactive power trigger's enablement criteria may be similar or the same as those used for the active power trigger.

The reactive power ramp rate determination module 152 may also incorporate a ramp rate limiter (not shown).

The selected ramp rates or the commands to use predetermined rates are communicated by the determination module to the signal conditioning unit 158, and these are dispatched along with the set points to the individual generators 25 or sub-plants 13 accordingly.

The generators 25 of the sub-plant 13 are then operated to change their power output according to the ramp rate provided or the predetermined rates so as to achieve the targeted generator output indicated by the set points.

Many modifications may be made to the above examples without departing from the scope of the present invention as defined in the accompanying claims.

The invention claimed is:

1. A method of controlling a hybrid power plant connected to a power network, the hybrid power plant having a first renewable energy generator and a second renewable energy generator, the first renewable energy generator being configured to generate power using a different source of renewable energy than the second renewable energy generator, the method comprising:
   determining a target plant power output for the hybrid power plant;
   determining a target generator power output for each of the first renewable energy generator and the second renewable energy generator based on the target plant power output;
   determining (i) a first ramp rate for the first renewable energy generator based, at least in part, on an attribute of the first renewable energy generator and (ii) a first preset ramp rate for the first renewable energy generator different from the first ramp rate;
   determining (i) a second ramp rate for the second renewable energy generator based, at least in part, on an attribute of the second renewable energy generator and (ii) a second preset ramp rate for the second renewable energy generator different from the second ramp rate;
   monitoring at least one of a short-circuit ratio of the power network or a rate of change of a frequency of the power network;
   operating the first renewable energy generator according to the target generator power output for the first renewable energy generator and according to (i) the first ramp rate when the at least one of the short-circuit ratio or the rate of change of the frequency meets a threshold or (ii) the first preset ramp rate when the at least one of the short-circuit ratio or the rate of change of the frequency does not meet the threshold; and
   operating the second renewable energy generator according to the target generator power output for the second renewable energy generator and according to (i) the second ramp rate when the at least one of the short-circuit ratio or the rate of change of the frequency meets the threshold or (ii) the second preset ramp rate when the at least one of the short-circuit ratio or the rate of change of the frequency does not meet the threshold.

2. The method of claim 1, further comprising monitoring at least one inhibit condition, wherein the first renewable energy generator is operated according to the first ramp rate when the at least one of the short-circuit ratio or the rate of change of the frequency meets the threshold and the at least one inhibit condition is not fulfilled.

3. The method of claim 2, wherein the at least one inhibit condition is based on an operational parameter of at least one of the first renewable energy generator or the second renewable energy generator.

4. The method of claim 1, wherein the attribute of the respective renewable energy generator is a type of the respective renewable energy generator.

5. The method of claim 1, wherein the first ramp rate is based on a monitored parameter of the hybrid power plant or of the power network.

6. The method of claim 5, wherein the monitored parameter is a rate of change of a frequency.

7. The method of claim 1, wherein the first renewable energy generator comprises a wind turbine generator, and wherein the second renewable energy generator comprises a photovoltaic cell.

8. The method of claim 1, wherein the hybrid power plant further comprises a battery unit, the method further comprising:
   determining a target generator power output for the battery unit based on the target plant power output;
   determining a ramp rate for the battery unit; and
   operating the battery unit to change a power output to the power network at the determined ramp rate to achieve the target generator power output.

9. A power plant controller, comprising:
   an input/output interface;
   a memory containing instructions;
   a processor, which when programmed with the instructions, performs an operation of controlling a hybrid power plant connected to a power network, the hybrid power plant having a first renewable energy generator and a second renewable energy generator, the first renewable energy generator being configured to generate power using a different source of renewable energy than the second renewable energy generator, the operation comprising:
      determining a target plant power output for the hybrid power plant;
      determining a target generator power output for each of the first renewable energy generator and the second renewable energy generator based on the target plant power output;
      determining (i) a first ramp rate for the first renewable energy generator based, at least in part, on an attribute of the first renewable energy generator and (ii) a first preset ramp rate for the first renewable energy generator different from the first ramp rate;
      determining (i) a second ramp rate for the second renewable energy generator based, at least in part, on an attribute of the second renewable energy generator and (ii) a second preset ramp rate for the second renewable energy generator different from the second ramp rate;
      monitoring at least one of a short-circuit ratio of the power network or a rate of change of a frequency of the power network;
      operating the first renewable energy generator according to the target generator power output for the first renewable energy generator and according to (i) the first ramp rate when the at least one of the short-circuit ratio or the rate of change of the frequency meets a threshold or (ii) the first preset ramp rate when the at least one of the short-circuit ratio or the rate of change of the frequency does not meet the threshold; and operating the second renewable energy generator according to the target generator power output for the second renewable energy generator and according to (i) the second ramp rate when the at least one of the short-circuit ratio or the rate of change of the frequency meets the threshold or (ii) the second preset ramp rate when the at least one of the short-circuit ratio or the rate of change of the frequency does not meet the threshold.

10. A non-transitory computer readable medium storing a computer program product comprising program code instructions for implementing an operation of controlling a hybrid power plant connected to a power network, the hybrid power plant having a first renewable energy generator and a second renewable energy generator, the first renewable energy generator being configured to generate power using a different source of renewable energy than the second renewable energy generator, the operation comprising:

determining a target plant power output for the hybrid power plant;

determining a target generator power output for each of the first renewable energy generator and the second renewable energy generator based on the target plant power output;

determining (i) a first ramp rate for the first renewable energy generator based, at least in part, on an attribute of the first renewable energy generator and (ii) a first preset ramp rate for the first renewable energy generator different from the first ramp rate;

determining (i) a second ramp rate for the second renewable energy generator based, at least in part, on an attribute of the second renewable energy generator and (ii) a second preset ramp rate for the second renewable energy generator different from the second ramp rate;

monitoring at least one of a short-circuit ratio of the power network or a rate of change of a frequency of the power network;

operating the first renewable energy generator according to the target generator power output for the first renewable energy generator and according to (i) the first ramp rate when the at least one of the short-circuit ratio or the rate of change of the frequency meets a threshold or (ii) the first preset ramp rate when the at least one of the short-circuit ratio or the rate of change of the frequency does not meet the threshold; and operating the second renewable energy generator according to the target generator power output for the second renewable energy generator and according to (i) the second ramp rate when the at least one of the short-circuit ratio or the rate of change of the frequency meets the threshold or (ii) the second preset ramp rate when the at least one of the short-circuit ratio or the rate of change of the frequency does not meet the threshold.

* * * * *